United States Patent [19]
Handte

[11] Patent Number: 5,130,630
[45] Date of Patent: Jul. 14, 1992

[54] MANDREL-MOVING CONTROL CIRCUIT, AND METHOD

[75] Inventor: Herbert Handte, Filderstadt, Fed. Rep. of Germany

[73] Assignee: Moog GmbH, Böblingen, Fed. Rep. of Germany

[21] Appl. No.: 358,694

[22] Filed: May 26, 1989

[30] Foreign Application Priority Data

May 31, 1988 [EP] European Pat. Off. ......... 88108704.3

[51] Int. Cl.[5] .............................................. G05B 19/10
[52] U.S. Cl. .................................................. 318/567
[58] Field of Search ................... 318/567, 609, 568.1; 264/40.5

[56] References Cited

U.S. PATENT DOCUMENTS

| | | | |
|---|---|---|---|
| 4,011,493 | 3/1977 | Fukase et al. | 318/568.1 |
| 4,159,293 | 6/1979 | Fukase et al. | 264/40.5 |
| 4,224,560 | 9/1980 | Uekusa | 318/603 |
| 4,396,975 | 8/1983 | Kurakake | 318/609 X |

FOREIGN PATENT DOCUMENTS 0058297 1/1982 European Pat. Off. .

OTHER PUBLICATIONS

"Signals and Systems", Alan V. Oppenheim and Alan S. Willsky, Prentice Hall Int. 1983; p. 421.

Barthel et al., "Automatisieren bei Kunststoffblasformmaschinen", Kunststoffe 76 (1986) p. 485 et seq.
Hess et al., "Mikroprozessortechnik im Blasformbetrieb", Kunststoffe (1985).
"Systemtechnik für Blasformmaschinen", Moog GmbH (1983).

Primary Examiner—William M. Shoop, Jr.
Assistant Examiner—Saul M. Bergmann
Attorney, Agent, or Firm—Sommer, Oliverio & Sommer

[57] ABSTRACT

A control circuit (10) for an extrusion die (13) is operatively arranged to supply a command signal ($e_c$) to an actuator (24,25) for controlling the movement of a mandrel (11) relative to a die head (12) as plasticized material is extruded through an orifice (14) to form a parison (15). The controller includes a memory (28) for receiving and storing a plurality of initial set points supplied from a keypad (29). A recalculation circuit (42) is operatively arranged to recalculate the magnitude of each set point according to the equation $S_{n(r)} = (S_{n(i)} - G_1)B + G_2$, where $S_{n(r)}$ is the recalculated value at a particular set point, $G_1$ is a first reference die gap, $G_2$ is a second reference die gap, B is a scaling factor, and $S_{n(i)}$ is the corresponding initial set point stored in memory. The recalculation circuit is operatively arranged to supply each recalculated set point to the memory to replace the initial set point stored therein. The recalculated set points are supplied to the actuator, via an interpolator (30) for controlling movement of the mandrel during an extrusion cycle.

11 Claims, 3 Drawing Sheets

MANDREL-MOVING CONTROL CIRCUIT, AND METHOD

TECHNICAL FIELD

This invention relates generally to extrusion dies, and, more particularly, to an improved method and apparatus for controlling the movement of a mandrel relative to a die head so as to selectively vary the width of a die gap for controlling the wall thickness profile of a parison formed by material extruded through such gap.

BACKGROUND ART

In blow-molding plastic articles, such as bottles and the like, a substantially-cylindrical preform or parison is first extruded through the orifice of an extrusion die. This type of die generally includes a die head provided with a passageway through which the heated plastic material is forcibly expelled. A mandrel is operatively arranged for controlled axial movement relative to this passageway to vary the cross-sectional annular are of the orifice formed between the mandrel and the walls of the die head surrounding the material passageway. Plasticized material is extruded through the orifice to form a parison or preform.

If the parison is to be subsequently subjected to a blow-molding operation, the outer surface of the object-to-be-formed will ultimately be determined by the internal shape and configuration of the mold. Hence, it is desirable to selectively vary the wall thickness of the parison at different points along its extruded longitudinal extent, in order that sufficient material will be available at the desired locations on the parison, when the parison is subsequently inflated. This is particularly true when the object-to-be-produced is to have an articulated outer shape, but substantially-constant wall thickness.

To produce a parison having the desired wall thickness profile, the mandrel is moved axially relative to the die head during the extrusion cycle to vary the size of the orifice area through which material is extruded. This orifice area (A) is annular, and is proportional to the difference between the square of the effective die passageway diameter (D) and the square of the mandrel diameter (d) at the orifice [(i.e., $A=\pi/4)D^2-d^2)$]. The size of the orifice is often expressed in terms of the die gap (G), which is simply the difference between the die head and mandrel diameters (i.e., $G=D-d$). Thus, the size of the orifice may be expressed in terms of its area (A) or in the terms of the die gap (G), and these two expressions are related to one another, albeit non-linearly. Hence, if the mandrel is moved toward the die head, the width of the die gap will be reduced, less material will be extruded therethrough, and the wall thickness of the parison will be reduced at such locations. On the other hand, if the mandrel is moved away from the die head so as to increase the width of the die gap, a greater volume of material may be extruded therethrough, and the wall thickness of the resulting parison may be greater in such regions. Thus, the mandrel must be capable of controlled movement toward and away from the die head to selectively vary the wall thickness profile of the parison as it is formed.

The wall thickness pattern along the length of the preform, also commonly known as the profile, may, for example, be determined by means of a plurality of potentiometers, each representing a discrete point along the axial length of the parison. In certain cases, there may be as many as twenty-five potentiometers. These may be of the slide-type, and therefore capable of infinite adjustment. The output voltages of the potentiometers are successively sensed during an extrusion cycle, and are supplied to a servoactuator which selectively controls the position of the mandrel relative to the die head as a parison is extruded. Thus, the group of potentiometers, whatever their number, may constitute a wall thickness program generator, and, assuming their individual settings remain unchanged, also serves as a type of memory for storing the desired profile from one extrusion cycle to the next.

The particular settings of the individual potentiometers are normally determined and optimized on an individual basis, simply by trial-and-error. To simplify adjustment, some control circuits incorporate a variable adjustment by which each of the individual output voltages may be modified at the same time. This type of controller is shown and described, for example, in Pamphlet 823D, *Systemtechnik fur Blasformmaschinen*, Moog GmbH, Böblingen, Federal Republic of Germany (October 1983). This adjustment is somewhat analogous to a common gain in the sense that the output signals of the several individual potentiometers will be multiplied thereby. Hence, if the output voltage of each individual potentiometer is multiplied by a common gain, the output voltages of all potentiometers can be proportionally changed by selectively varying the magnitude of the gain. If the gain is 1.0, then the output voltage of each potentiometer will correspond to its individual setting; if the gain is less than 1.0, then the output voltages of the various potentiometers will be proportionally reduced below their individual settings; and if the gain is greater than 1.0, then the output voltages of the several potentiometers will be proportionally increased above their individual settings. Thus, while the settings of the various potentiometers may be selectively changed on an individual basis, a variation in the common gain will simultaneously affect the output voltages of all potentiometers. Moreover, it is possible to add to these signals, a constant signal representing a basic die gap or minimum orifice area.

This solution suffers a disadvantage if the relationship between the variable program (i.e., the individual output voltages multiplied by the common gain) and the basic or minimum die gap, is fixed. For example, if such relationship is, say 2-to-1, a maximum of one-third of the maximum possible wall thickness can be selected by varying the basic die gap, whereas a maximum of two-thirds of such maximum possible wall thickness can be selected by adjusting the variable program. Hence, the annular extrusion die orifice can not be completely opened by varying the basic gap alone; nor can it be completely opened by varying the adjustable program alone. Thus, if it were desired to decrease a particular set point of the wall thickness program to a value less than that initially set by the basic die gap, the basic die gap would first have to be reduced, and then each setting of the variable program would have to be reset accordingly. Conversely, if it were desired to increase a particular set point to a value greater than the limit of the variable program, then the width of the basic die gap would first have to be increased, and thereafter the variable program would have to be appropriately reduced to accommodate the increase in the basic gap. Hence, readjustments exceeding specific limit values often necessitated resetting all the potentiometers, followed by repetitive trial-and-error techniques to optimize the varied profile.

DISCLOSURE OF THE INVENTION

The present invention provides an improved method and apparatus for selectively controlling the movement of a mandrel relative to a die head during an extrusion cycle, without the necessity of having to reset a large number of program values, such as an individual potentiometer settings, when previously-established limit values are exceeded.

Accordingly, the present invention provides, in one aspect, an improved control circuit which is adapted to be associated with an extrusion die, the die having a mandrel mounted for movement relative to a die head and having an actuator adapted to be supplied with a command signal for controlling the movement of the mandrel relative to the die head so as to selectively vary the width of the die gap through which material may be extruded to form a parison. The improved control circuit broadly includes: a memory for receiving and storing a plurality of set points supplied thereto and for supplying the command signal to the actuator; first input means for supplying a plurality of initial set points to the memory, these initial set points defining an initial wall thickness profile of the parison; and recalculation means operatively arranged to recalculate the magnitude of each stored set point according to the equation $S_{n(r)}=(S_{n(i)}-G_1)B+G_2$, where $S_{n(r)}$ is the recalculated magnitude of a particular set point, $G_1$ is an initial or first reference die gap, $G_2$ is a second reference die gap, B is a scaling factor and $S_{N(i)}$ is the corresponding initial set point stored in the memory. The recalculated set points define a desired wall thickness profile of a parison. The recalculation means is operatively arranged to supply each recalculated set point to the memory to replace the corresponding initial set point stored in the memory, such that the memory will supply the recalculated set points to the actuator.

In another aspect, the invention provides an improved method of controlling the wall thickness profile of a parison extruded from an extrusion die, the die having a mandrel mounted for movement relative to a die head for varying the width of the die gap through which material may be extruded to form the parison, and having an actuator adapted to be supplied with a command signal reflective of the desired wall thickness profile of the parison for selectively moving the mandrel relative to the die head during an extrusion cycle. The improved method broadly includes the steps of: providing a memory adapted to receive and store a plurality of set points, each set point being reflective of a desired wall thickness of the parison at a particular location therealong; supplying a plurality of initial set points to the memory, these initial set points defining an initial wall thickness profile of the parison; recalculating the magnitude of each stored set point according to the equation $S_{n(r)}=(S_{n(i)}-G_1)B+G_2$, where $S_{n(r)}$ is the recalculated value of a particular set point, $G_1$ is a first reference die gap, $G_2$ is a second reference die gap, B is a scaling factor, and $S_{n(i)}$ is the initial value of the corresponding set point stored in the memory, these recalculated set points representing the desired wall thickness profile of the parison; replacing each set point stored in the memory with its corresponding recalculated value; and supplying the recalculated set points to the actuator; thereby to cause the wall thickness profile of the parison to conform to the recalculated set points.

Accordingly, the general object of this invention is to provide an improved control circuit for selectively moving a mandrel relative to a die head during an extrusion cycle so as to vary the wall thickness profile of an extruded parison.

Another object is to provide an improved method of controlling the wall thickness of a parison extruded through the orifice of an extrusion die.

Another object is to provide an improved mandrel-moving control circuit in which each of the various set points initially supplied to a memory may be automatically recalculated.

These and other objects and advantages will become apparent from the foregoing and ongoing written specification, the drawings, and the appended claims.

MODE(S) OF CARRYING OUT THE INVENTION

Figure 1:
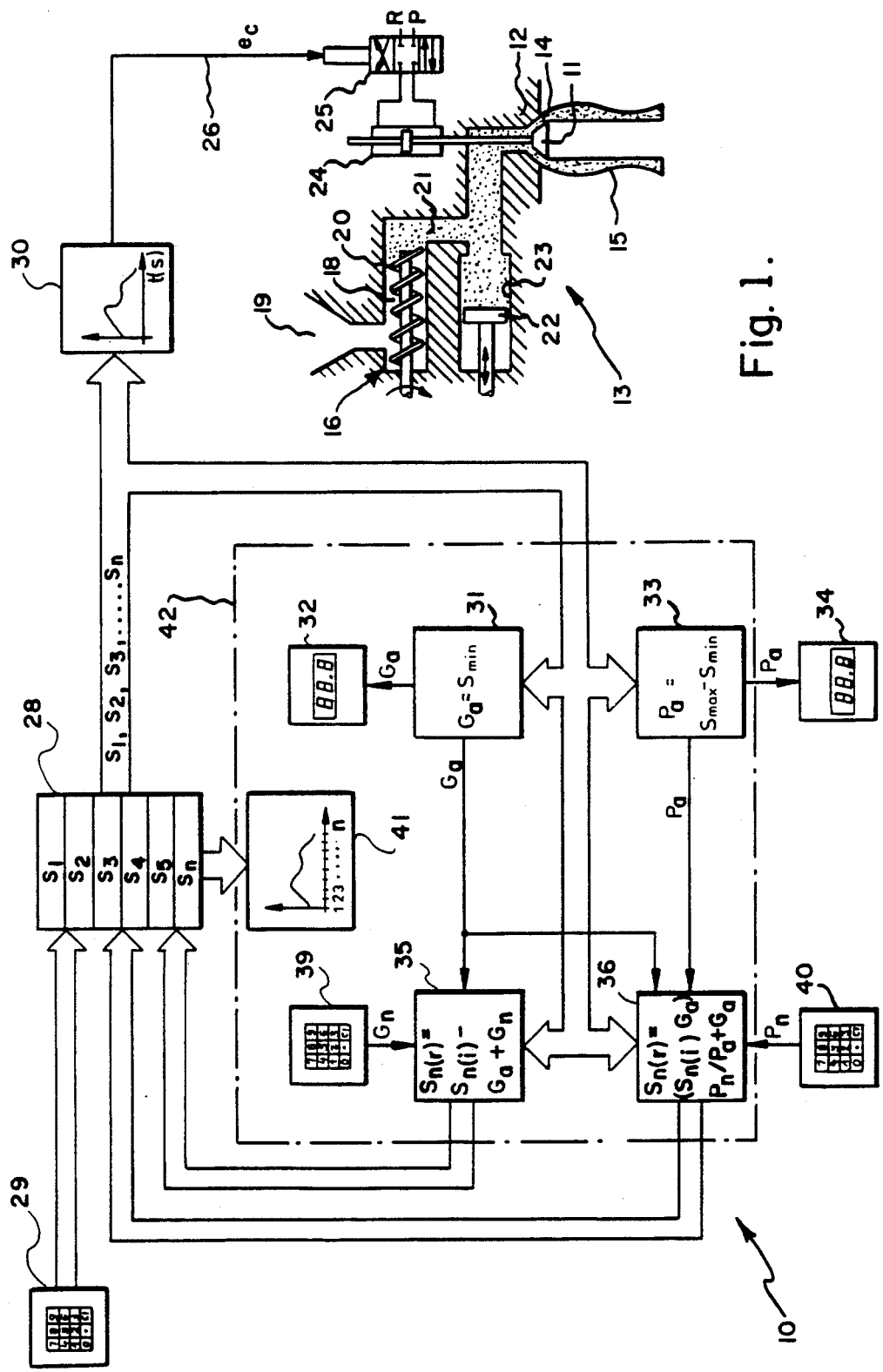
FIG. 1 is a block diagram of the improved control circuit in associated with a servoactuator-controlled extrusion die, through which a parison formed.

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g. arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

Referring now to the drawings, and, more particularly, to FIG. 1 thereof, this invention provides an improved control circuit, of which the presently-preferred embodiment is generally indicated at 10, for selectively controlling the movement of a mandrell 11 relative to the head 12 of an extrusion die, generally indicated at 13.

Mandrel 11 is shown as being mounted for vertical movement toward and away from the die head to selectively vary the width of an annular die gap 14 formed therebetween. The width of this gap (i.e., $G=D-d$), and hence the cross-sectional area or such orifice [(i.e., $A=\pi/4(D^2-d^2)$], varies with the axial position of the mandrel relative to the die head. A plasticized extrudable material, typically a suitable thermoplastic, can be selectively forced through discharge orifice 14 to form a depending substantially-cylindrical preform or parison 15, which may be subsequently inflated to the desired shape (e.g., a bottle, or some other article) in a blow mold (not shown). A plasticizing means 16 is provided with a heated chamber 18, into which granular material may be introduced through a charging funnel 19. A rotatable screw conveyor 20 is arranged in chamber 19 and is operable to convey heated plasticized material through a channel 21 to discharge opening 14. Channel 21 communicates with an accumulator having a plunger 22 slidably mounted in a cylinder 23.

The mandrel 11 is moved axially relative to the die head by means of a double-acting fluid-powered actuator 24, which selectively communicates with a suitable pressurized fluid source P and a fluid sump or return R via an electrohydrualic servovalve 25, which in turn is supplied with, and controlled by, and electrical command signal $e_c$, indicated as being present in line 26, supplied by control circuit 10. In order to form the parison 15 with desired and varying wall thicknesses at different points along its extruded length, servovalve 25 must be supplied with the command signal during each extrusion cycle.

FIG. 1 depicts the improved control circuit 10 as including a memory 28 which is arranged to receive and store a plurality of manually-entered set points from a first input means 29, such as a numeric keypad or keyboard. A plurality of individual set points (e.g. twenty-five or more) may be manually entered into memory 28 via keypad 29. Once received and stored in the memory, these initial set points are read out sequentially during an extrusion cycle when a parison is being formed. The memory output signal may be either time-multiplexed, or coupled to the position of the parison or some other member, as desired. The output of memory 28 is supplied to a program interpolator 30, which reads the sequential set points supplied by the memory, converts the step values of the various set points supplied by the memory into a smooth continuous curve, and supplies such curve as the command signal $e_c$ to the servoactuator. Interpolator 30 may, for example, be of the type disclosed in European Pat. No. 3510. A position servo-loop may be closed about the servoactuator.

The output of memory 29 is also supplied to a first computing means 31, which determines a basic or first reference die gap ($G_a$ may, for example, be the minimum ($S_{min}$) of all the set points initially stored in the memory, as in the disclosed embodiment. Alternatively, this reference gap value can be the maximum ($S_{max}$), the mean [$S_{mean}=(S_{min}+S_{max})/2$], or some other function of the initial set points stored in the memory. In any event, the basic die gap signal $G_a$ provided by the first computing means 31 is supplied to an indicator 32, which displays the numerical value of same.

The output of memory 28 is also supplied to a factor computing means 33, which constitutes a second computing means. In the illustrated embodiment, this factor computing means is arranged to calculate a first factor ($P_a$) by subtracting the minimum initial set point ($S_{min}$) stored in the memory from the maximum initial stored set point ($S_{max}$). Thus, $P_a=S_{max}-S_{min}$. The magnitude of such calculated factor is supplied to an indicator 34, which displays the numerical value of same.

The output of memory 28 is also supplied to a third computing means 35, which also receives the reference die gap output signal $G_a$ from the first computing means 31. The output of the third computing means is supplied as an input to memory 28. The output of memory 28 is also shown as being supplied to a fourth computing means 36, which also receives the output signals from the first and second computing means. The output of the fourth computing means is also supplied back to memory 28.

The third and fourth computing means recalculate the set points stored in memory, and, by virtue of their output signals being severally supplied to memory 28, afford the capability of overwriting and replacing the initial set point values stored in memory 28. When a new basic die gap $G_n$ is supplied to the third computing means via keypad input means 39, the third computing means will recalculate the initial set points stored in memory 28 according to the formula:

$$S_{n(r)}=S_{n(i)}-G_a+G_n \tag{1}$$

where $S_{n(r)}$ is the recalculated value of a particular set point, $S_{N(i)}$ is the initial value of that set point which was stored in memory 28 and which will be overwritten and replaced by the recalculated value $S_{n(r)}$ where the calculation is finished, $G_a$ is the old basic die gap calculated by the first computing means 31 on the basis of the initial set points present in memory 28, and $G_n$ is the new basic die gap supplied via keypad 39.

When a new factor $P_n$ is supplied to the fourth computing means 36 from keypad 40, the various set points stored in the memory will be recalculated by the fourth computing means 40 according to the formula:

$$S_{n(r)}=(S_{n(i)}-G_a)P_a+G_a \tag{2}$$

where $S_{n(r)}$ is the recalculated value of a particular set point, $S_{n(i)}$ is the initial value of the corresponding set point stored in the memory, $G_a$ is the basic gap, which does not change when the magnitude of the factor is changed, $P_a$ is the old factor which was calculated on the basis of the values of the set points initially stored in memory, and $P_n$ is the new factor supplied via keypad 40.

The above equations also demonstrate that, on the basis of the individual set points supplied via keypad 29, a new reference die gap and a new factor will be calculated in the first and second computing means, respectively, if the magnitude of a new set point lies beyond the limits from which the old basic gap $G_a$ and old factor $P_a$ were calculated.

FIG. 1 also depicts display means 41, which visually displays the values of the various set points contained in memory 28, in the form of a graphic representation or curve. The operator can thus visually monitor the set points presently in the memory.

Equations (1) and (2) can be further generalized as having the form:

$$S_{n(r)}=(S_{n(i)}-G_1)B+G_2 \tag{3}$$

where $S_{n(r)}$ is the recalculated magnitude of a particular set point, $S_{n(i)}$ is the initial value of the corresponding set point stored in memory 28, $G_1$ is the old reference die gap, $G_2$ is a new reference die gap (i.e., either a new value $G_n$ supplied via keypad 39 or a recalculated value $G_a$ supplied by first computing means 31, as appropriate) and B is an appropriate scaling factor (i.e., $B=P_n/P_a$). In equation (1), the scaling factor is 1.0, $G_1=G_a$ and $G_2=G_n$. In equation (2), the scaling factor is the ratio of $P_n/P_a$, $G_1=G_a$ and $G_2=G_a$.

Thus, the invention broadly provides an improved control circuit 10 which is adapted to be associated with an extrusion die 13 having a mandrel 11 mounted for movement relative to a die head 12, and having an actuator (i.e., the servoactuator including servovalve 25 and actuator 24) adapted to be supplied with a command signal ($e_c$) for controlling the movement of the mandrel relative to the die head so as to selectively vary the width of a die gap (i.e., $G=D-d$) through which material may be extruded to form a parison. The control circuit includes: a memory (e.g., 28) for receiving and storing a plurality of set points supplied thereto and for supplying the command signal to the actuator; first input means (e.g., keypad 29) for supplying a plurality of initial set points to the memory, the initial set points defining an initial wall thickness profile of the parison; and recalculation means, generally indicated at 42 (e.g., including the four calculation means 31, 33, 35, 36 and their associated keypads) operatively arranged to recalculate the magnitude of each initial set point stored in the memory according to equation (3) above, and for supplying such recalculated set points to the memory to overwrite and replace the corresponding initial set point supplied by the first input means such that the memory will supply the recalculated set points to the actuator.

The operation of the improved control circuit is comparatively illustrated in FIGS. 2a–2e.

Figure 2A:
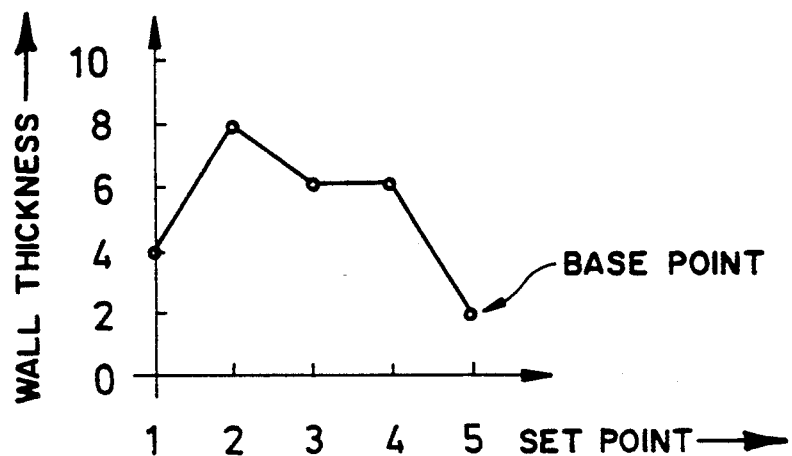
FIG. 2a is a plot of wall thickness (ordinate) vs. set point (abscissa) of an illustrative wall thickness profile.
Figure 2B:
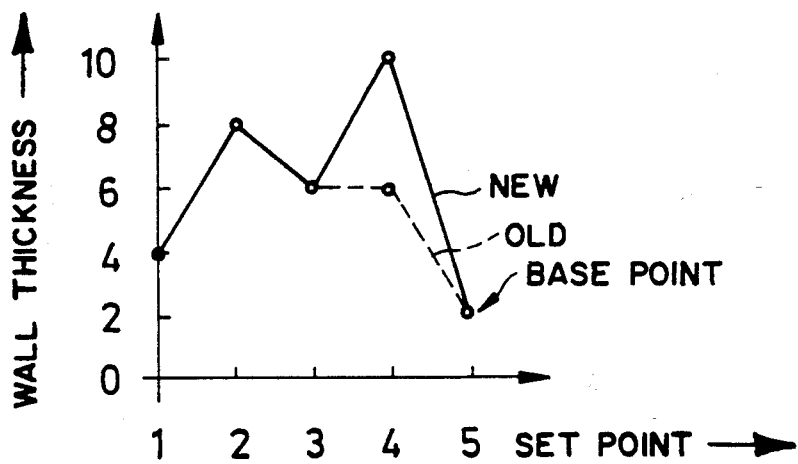
FIG. 2b is a plot similar to FIG. 2a, but showing, in solid, the desired profile after the operator has provided a new value of $S_4=10$.

FIG. 2a depicts a markedly-shortened wall thickness program, or profile, as having only five initial set points supplied from keypad 29. The magnitudes of these set points are as follows: $S_1=4$, $S_2=8$, $S_3=6$, $S_4=6$ and $S_5=2$. As described above, the first computing means 31 will calculate the reference die gap ($G_a$) as the minimum value of the initial set points stored in the memory. Thus, in this illustration, $G_a=S_{min}=2$. The second computing means 33 will calculate factor $P_a$ as the difference between the maximum and minimum set points. Hence, $P_a=S_{max}-S_{min}=S_2-S_5=8-2=6$.

Assume now than an operator changes the value of one of the set points. For the purposes of illustration, assume that the operator supplies a new value of $S_4=10$ from keypad 29. The new wall thickness profile is shown in solid in FIG. 2b, whereas the original profile is depicted by the dashed line. With the exception of the new initial value of $S_4$, all of the other values of the profile remain the same. Since the new value of $S_4$ is still greater than $S_{min}=2$, the original reference die gap, $G_a=S_{min}=2$, remains unchanged. However because the new initial value of $S_4$ is now the greatest value of the set points, the second computing circuit recalculates the factor (i.e., $P_a=S_{max}-S_{min}=S_4-S_5=10-2=8$).

Figure 2C:
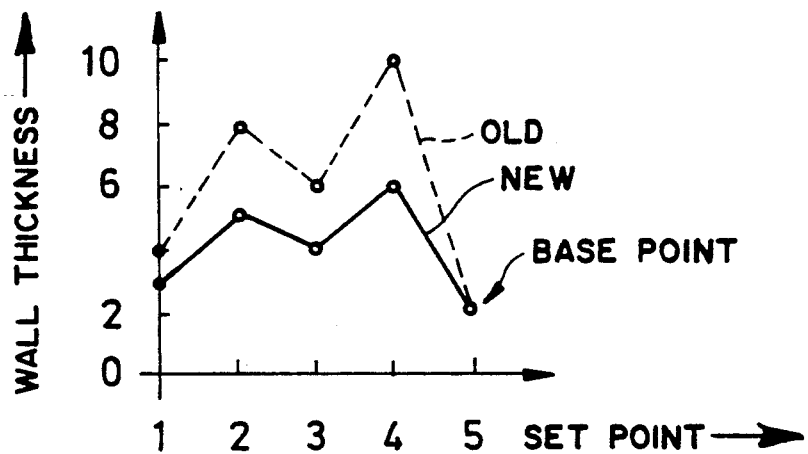
FIG. 2c is a plot similar to FIG. 2b, but showing, in solid, the resulting profile when the operator has provided a new factor of $P_n=4$.

Assume now that the operator now wishes to manually change the factor to a new value, say, $P_n=4$. FIG. 2c depicts that, with the exception of $S_{min}=S_5=2$, all the other stored values are recalculated according to equation (2) above (i.e., $S_{n(r)}=(S_{n(i)}-G_a)P_n/P_a+G_a$). Thus, with $G_a=S_{min}=2$, and $P_a=S_{max}-S_{min}=10-2=8$, the following values are recalculated: $S_1=(4-2)4/8+2=3$, $S_2=(8-2)4/8+2=5$, $S_3=(6-2)4/8+2=4$, $S_4=(10-2)4/8+2=2$, and $S_5=(2-2)4/8+2=2$. The resulting wall thickness profile is shown in solid in FIG. 2c.

Figure 2D:
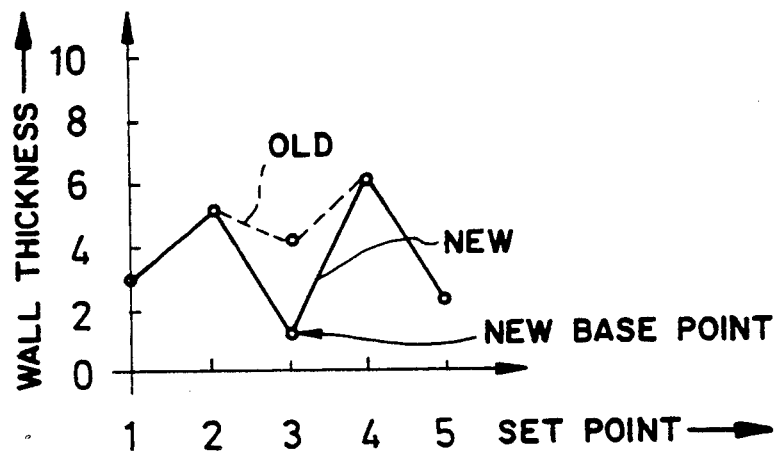
FIG. 2d is a plot similar to FIG. 2c, but showing, in solid, the resulting profile when the operator reduces set point $S_3$ to a value below $S_{min}$.
Figure 2E:
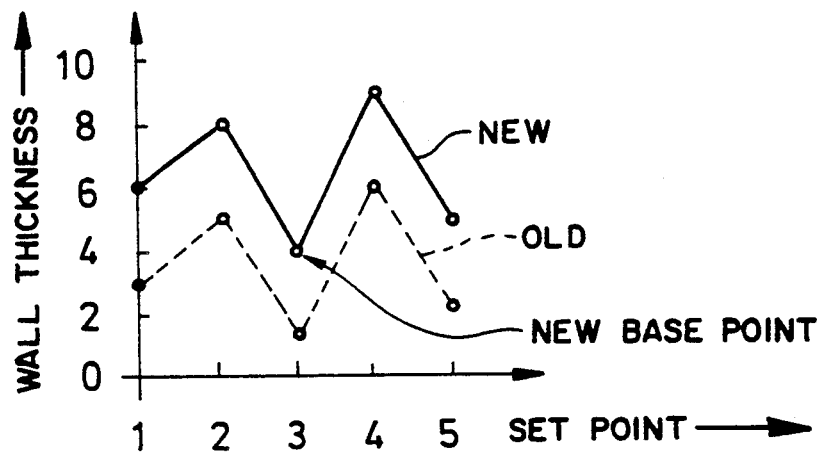
FIG. 2e is a plot similar to FIG. 2d, but shows, in solid, the resulting profile when the operator introduces a new reference die gap $G_n$.

Assume now that an operator decides to reduce set point $S_3$ to a value lower than $S_5$, say, $S_3=1$. The resulting profile is shown in FIG. 2d. Since the new value of $S_3$ is now lower than the stored minimum set point (i.e., $S_{min}=2$), the first computing circuit 31 calculates a new reference gap value of $G_n=S_{min}=S_3=1$. The second computing circuit 33 now recalculates the factor as $P_a=S_{max}-S_{min}=S_4-S_3=6, -1=5$.

Assume now that the operator manually supplies a new reference gap of, say, $G_n=4$ via keypad 39. All set points stored in the memory have been changed by the difference between old die gap and the new gap, according to equation (1) above (i.e., $S_{n(r)}=S_{n(i)}=S_{n(i)}--G_a+G_n$). Hence, with $G_a=S_{min}=1$, the third computing circuit 35 computes the following values of the set points: $S_1=3-1+4=6$, $S_2=5-1+4=8$, $S_3=1-1+4=4$, $S_4=6-1+4=9$, and $S_5=2-1+4=5$. This new profile is shown represented by the solid curve in FIG. 2e.

Therefore, in use, control circuit 10 performs the improved method of controlling the wall thickness profile of a parison extruded from an extrusion die, the die having a mandrel mounted for movement relative to a die head for varying the width of a die gap through which material may be extruded to form a parison, and having an actuator adapted to be supplied with a command signal reflective to the desired wall thickness of the parison at various points along its extruded length for selectively moving the mandrel relative to the die head during the extrusion cycle. The improved method broadly includes the steps of: providing a memory adapted to receive and store a plurality of set points supplied thereto; supplying a plurality of initial set points to the memory, these initial set points defining an initial wall thickness profile of the parison; recalculating the magnitude of each set point stored in the memory according to the equation (3) above; replacing each initial set point stored in the memory with its recalculated value; and supplying such recalculated set points to the actuator for controlling the wall thickness profile of the extruded parison.

Of course, the invention contemplates that many changes and corrections may be made. For example, the various values may be supplied through separate keypads, as illustrated, or may be provided by a common keypad, which is channeled or otherwise selected to provide the desired input. The various indicators and displays are optional, and may be omitted if desired.

Therefore, while the presently-preferred form of the improved control circuit has been shown and described, and several modifications and changes thereof discussed, persons skilled in this are will readily appreciate that various additional changes and modification may be made without departing from the spirit of the invention, as defined and differentiated by the following claims.

I claim:

1. A control circuit adapted to be associated with an extrusion die, said die having a mandrel mounted for movement relative to a die head and having an actuator adapted to be supplied with a command signal for controlling the movement of said mandrel relative to said die head so as to selectively vary the width of a die gap through which material may be extruded to form a parison, said control circuit comprising:

a memory for receiving and storing a plurality of set points supplied thereto and for supplying said command signal to said actuator;

first input means for supplying a plurality of initial set points to said memory, said initial set points defining an initial wall thickness profile of said parison; and recalculation means operatively arranged to recalculate the magnitude of each initial set point according to the equation $S_{n(r)}=(S_{n(i)}-G_1)B+G_2$, where $S_{n(r)}$ is the recalculated magnitude of a particular set point, $G_1$ is a first reference die gap, $G_2$ is a second reference die gap, B is a desired scaling factor, and $S_{n(i)}$ is the corresponding initial set point stored in the memory, such recalculated set points defining a desired wall thickness profile of the parison, said recalculation means being operatively arranged to supply each recalculated set point to said memory to replace the initial set point supplied by said first input means;

whereby said memory will supply said recalculated set points to said actuator.

2. A control circuit as set forth in claim 1, and further comprising: second input means for selectively varying the magnitude of said second reference die gap.

3. A control circuit as set forth in claim 1, and further comprising: third input means for selectively varying the magnitude of said scaling factor.

4. A control circuit as set forth in claim 1 wherein the magnitude of said reference die gap is equal to the magnitude of the smallest set point stored in said memory.

5. A control circuit as set forth in claim 1 wherein the magnitude of said first reference die gap is equal to the mean of the magnitudes of the largest and smallest set points stored in said memory.

6. A control circuit as set forth in claim 1 wherein the magnitude of said first reference die gap is equal to the magnitude of the greatest set point stored in said memory.

7. A control circuit as set forth in claim 1, and further comprising:

an interpolator operatively arranged to modify the command signal supplied from said memory to said actuator such that the transition between said set points is a smooth continuous curve, and for supplying said curve as the command signal to said actuator.

8. The method of controlling the wall thickness of a parison extruded from an extrusion die, said die having a mandrel mounted for movement relative to a die head for varying the width of a die gap through which material may be extruded to form a parison, and having an actuator adapted to be supplied with a command signal reflective to the desired wall thickness of said parison at various points along its extruded length for selectively moving said mandrel relative to said die head during an extrusion cycle, which method comprises the steps of:

providing a plurality of initial set points reflecting an initial desired wall thickness profile of said parison;

storing said initial set points;

recalculating the magnitude of each stored initial set point according to the equation $S_{n(r)}=(S_{n(i)}-G_1)B+G_2$, where $S_{n(r)}$ is the recalculated value of a particular set point, $G_1$ is a first reference die gap, $G_2$ is a second reference die gap, B is a desired scaling factor, and $S_{n(i)}$ is the corresponding stored initial set point, such recalculated set points redefining a desired wall thickness profile of said parison;

replacing each stored initial set point with its recalculated value; and supplying said recalculated set points as a command signal to said actuator;

thereby to cause the wall thickness profile of said parison to conform to said recalculated set points.

9. The method as set forth in claim 8, and further comprising the additional step of:

selectively varying said second reference die gap without distorting the shape of said wall thickness profile.

10. The method as set forth in claim 8, and further comprising the additional step of:

selectively varying the magnitude of said scaling factor without changing said first reference die gap.

11. The method as set forth in claim 8, and further comprising the additional steps of:

interpolating the command signal supplied to said actuator such that the transition between said set points is a smooth continuous curve; and supplying such interpolated command signal to said actuator.

* * * * *